United States Patent [19]
Foladare et al.

[11] Patent Number: 6,018,572
[45] Date of Patent: *Jan. 25, 2000

[54] METHOD AND APPARATUS FOR PRIORITIZING TELEPHONE CALLS

[75] Inventors: Mark J. Foladare, Kendall Park; Shelley B. Goldman, East Brunswick; Nancy S. Murray, Morris Township, Morris County; David P. Silverman, Somerville; Roy P. Weber, Bridgewater, all of N.J.

[73] Assignee: AT&T Corp., New York, N.Y.

[*] Notice: This patent is subject to a terminal disclaimer.

[21] Appl. No.: 08/731,872

[22] Filed: Oct. 21, 1996

Related U.S. Application Data

[63] Continuation of application No. 08/385,004, Feb. 7, 1995, Pat. No. 5,625,680.

[51] Int. Cl.$^7$ .................................................. H04M 3/42
[52] U.S. Cl. ........................................ 379/211; 379/220
[58] Field of Search .................................. 379/201, 243, 379/127, 142, 199, 200, 211, 219, 220, 221

[56] References Cited

U.S. PATENT DOCUMENTS

| | | |
|---|---|---|
| 3,600,522 | 8/1971 | Benson . |
| 4,266,098 | 5/1981 | Novak ...................................... 379/142 |
| 4,277,649 | 7/1981 | Sheinbein .............................. 179/18 B |
| 5,109,405 | 4/1992 | Morganstein ............................ 379/89 |
| 5,274,698 | 12/1993 | Jang ........................................ 379/200 |
| 5,329,578 | 7/1994 | Brennan et al. ........................ 379/142 |
| 5,375,161 | 12/1994 | Fuller et al. ............................. 379/210 |
| 5,625,680 | 4/1997 | Foladare et al. ........................ 379/199 |

FOREIGN PATENT DOCUMENTS

| | | | |
|---|---|---|---|
| 0 501 903 A1 | 9/1992 | European Pat. Off. | ......... H04M 1/66 |
| 0 613 280 A1 | 8/1994 | European Pat. Off. | ......... H04M 3/38 |

*Primary Examiner*—Scott Wolinsky

[57] ABSTRACT

A method and apparatus for prioritizing telphone calls that enables a caller to specify priority criteria relating to the calls and a recipient to specify priority criteria relating to the treatment of the calls.

30 Claims, 2 Drawing Sheets

METHOD AND APPARATUS FOR PRIORITIZING TELEPHONE CALLS

This is a continuation of application Ser. No. 08/385,004, filed Feb. 7, 1995, now issued as U.S. Pat. No. 5,625,680.

TECHNICAL FIELD

This invention relates to a method and apparatus for prioritizing telephone calls.

BACKGROUND OF THE INVENTION

There are existing methods of prioritizing telephone calls. For example, the name or telephone number of the caller party can be displayed on the recipient's telephone, a telephone can be provided with a function that blocks all incoming telephone calls on demand or telephone calls can be forwarded to an automated message center.

There also are existing methods of rerouting telephone calls. For example, call forwarding or automated answering systems that allow callers to reroute their telephone calls.

The existing methods of prioritizing and rerouting of telephone calls have several disadvantages. One distinct disadvantage with respect to prioritizing of telephone calls is that the caller does not have any control over the prioritizing of his telephone calls. Similarly, with respect to rerouting of telephone calls, the caller does not have any control over whether his call will be rerouted.

Existing methods of prioritizing and rerouting of telephone calls also have disadvantages from the recipient's perspective. For example, because the recipient does not know the nature of the call before answering, the recipient cannot prioritize or reroute calls based upon the nature of the call.

The deficiencies in the existing methods of prioritizing and rerouting of telephone calls is made readily apparent in telemarketing. Telemarketing is the use of telecommunication services to market and sell products and services and to provide customers with product and service information.

Often times, telemarketing agents expend time and effort calling potential customers only to be greeted by anger and irritation. Many people consider calls to their home during nonworking hours by nameless, faceless telemarketing agents to be an unwanted intrusion. In particular, potential customers often express anger and irritation when telemarketing agents call during dinner hour.

Thus, there is a need for a method and apparatus that allows the caller to designate the priority of a telephone call based on specified priority criteria and the recipient to designate treatment of telephone calls based on their specified priority criteria.

SUMMARY OF THE INVENTION

The above problems are solved according to the invention by providing a method and apparatus for prioritizing telephone calls. The invention allows a caller to designate the priority of his telephone call based upon specified priority criteria. The specified priority criteria follow the telephone call through the telephone network. The priority of the call is determined based on the specified priority criteria. The telephone call is connected, rerouted or terminated based upon the specified priority criteria.

More particularly a telephone service provider's network is equipped with an originating switch proximate to the caller. The originating switch is equipped with means for identifying specified priority criteria that the caller has assigned to his call. That specified priority criteria follows the call through the telephone service provider's network.

The telephone service provider's network is also equipped with a terminating switch proximate to the recipient. The terminating switch is equipped with means for identifying specified priority criteria that the recipient has assigned to incoming calls.

When the caller places a call to the recipient, the call arrives at the originating switch which undertakes to identify the specified priority criteria, if any, that the caller has assigned to the call. The originating switch then connects the call to the terminating switch. If the caller has assigned specified priority criteria to the call, that specified priority criteria follows the call through the telephone service provider's network from the originating switch to the terminating switch.

When the call arrives at the terminating switch, the terminating switch identifies the specified priority criteria, if any, that the recipient has assigned to incoming calls. If the recipient has assigned a specified priority criteria to incoming calls, the specified priority criteria that the recipient has assigned to incoming calls is compared to the specified priority criteria that the caller has assigned to the call. If the specified priority criteria that the recipient has assigned to incoming calls satisfies the specified priority criteria that the caller has assigned to the call, then the call is connected. If the specified priority criteria that the recipient has assigned to incoming calls does not satisfy the specified priority criteria that the caller has assigned to the call, then the call is either rerouted to an alternative destination or terminated.

The specified priority criteria that a caller can assign to a call and that the recipient can assign to incoming calls include any manner of denoting special treatment for a call. For example, the caller could specify that the call is a low priority call and the recipient could specify that low priority calls only be put through during certain times of the day. The specified priority criteria can be more particular. The caller could, for example, specify that the call relates to telemarketing or to a fund raising campaign and the recipient could specify that calls relating to telemarketing or fundraising not be put through at all or only be put through during certain times of the day.

The caller could, for example, designate that the call is of a personal nature. If the recipient, for example, is working at home and does not want to be interrupted by calls of a personal nature, the recipient could specify that all personal calls be directed to a answering machine device or a voice mail system. Similarly, if the recipient is out of his office and at home on vacation or with an illness, the recipient could, for example, specify that work related calls be directed to an answering machine or voice mail system. Alternatively if the recipient, for example, conducts business out of his home, and does not want business calls during evening hours, the recipient could specify that personal calls be put through during evening hours, but business calls received during evening hours be directed to an answering machine or voice mail.

As would be understood by a person of ordinary skill in the art, the invention can be used for prioritizing and directing of electronic data communication as well as telephone calls. For example, electronic mail ("E-mail") and facsimile transmissions can be prioritized and directed in the same manner as described above with respect to telephone calls.

DETAILED DESCRIPTION

Figure 1:
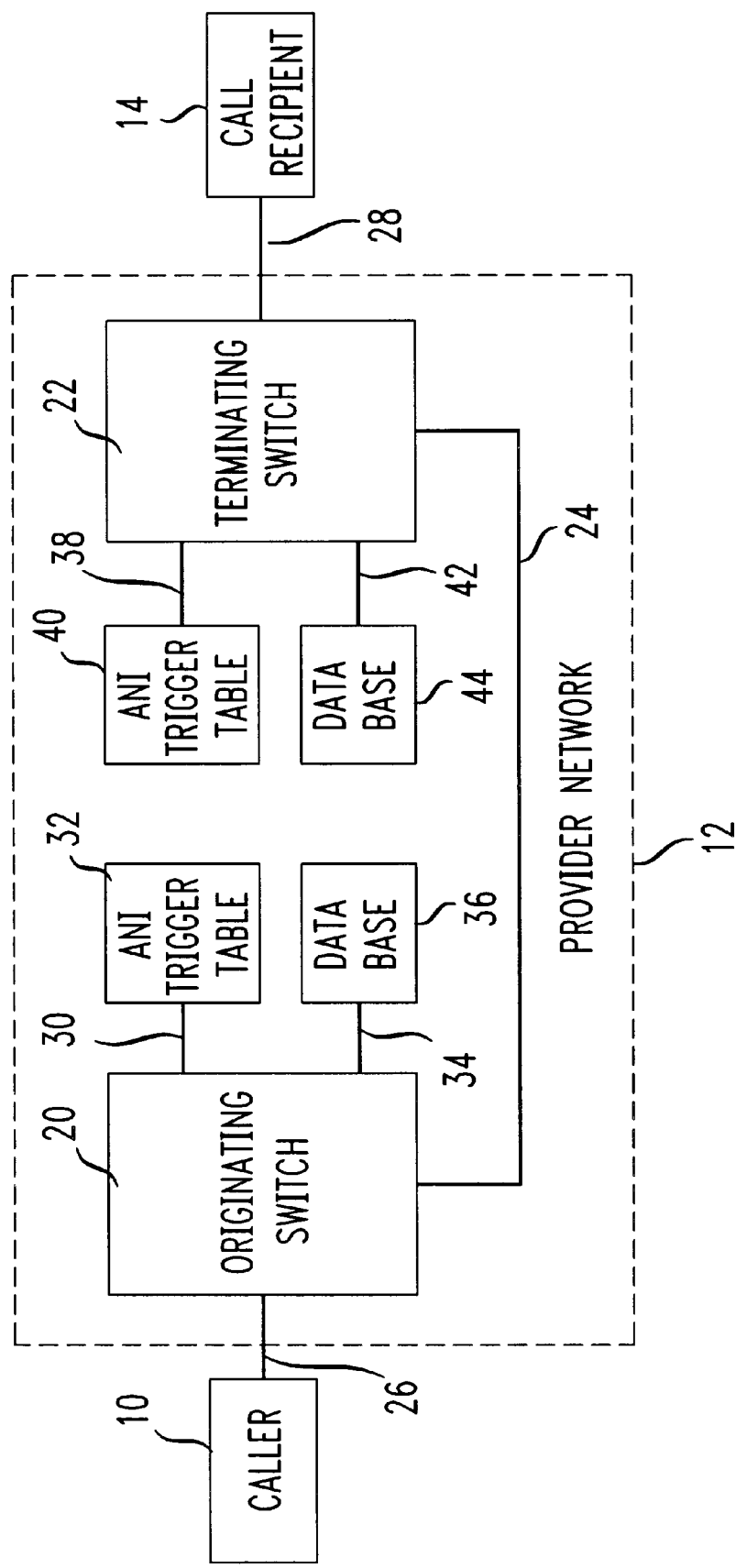
FIG. 1 is a block diagram which illustrates an embodiment of the invention.

FIG. 1 illustrates a basic configuration of an embodiment of the invention. A caller 10 is connected through a telephone service provider's network 12 to the call recipient 14. The telephone service provider's network 12 includes an originating switch 20 and a terminating switch 22 which are connected via link 24.

The caller 10 is connected via link 26 to the originating switch 20. Similarly, the terminating switch 22 is connected via link 28 to the call recipient 14.

The originating switch 20 is connected via link 30 to an automatic number identification ("ANI") "trigger table" 32. An ANI trigger table contains a list of the telephone numbers of subscribers to various special services offered by the telephone service provider. The originating switch 20 is also connected via link 34 to a data base 36.

Similarly, the terminating switch 22 is connected via link 38 to an ANI trigger table 40. The terminating switch 22 is also connected via link 42 to a data base 44.

When the caller 10 places a call to the call recipient 14, the call proceeds via link 26 to the originating switch 20. The caller's telephone number, which is identified by the telephone service provider's system, is transmitted with the call to the originating switch 20. Using the caller's telephone number, the originating switch queries the ANI trigger table 32 as to whether the caller 10 subscribes to any of the special services offered by the telephone service provider.

If the caller's telephone number does not appear on the ANI trigger table 32, the ANI trigger table 32 signals the originating switch 20 that the caller 10 does not subscribe to any of the special services offered by the telephone service provider. The originating switch then connects the call to the terminating switch 22 via link 24 and the terminating switch 22 connects the call to the call recipient 14 via link 28.

If, however, the caller's telephone number appears on the ANI trigger table 32, the ANI trigger table 32 signals the originating switch 20 that the caller 10 subscribes to at least one of the special services offered by the telephone service provider. The originating switch 20 then queries the data base 36 as to the particular special service offered by the telephone service provider to which the caller subscribes. The database identifies the caller as a subscriber to the telephone call prioritization system and provides the caller's specified priority criteria. The originating switch 20 connects the telephone call to the terminating switch 22 via link 24. The specified priority criteria that the caller has assigned to the call is transmitted with the call from the originating switch 20 to the terminating switch 22 via link 24. The call recipient's telephone number, which is identified by the telephone service provider's system, also is transmitted with the call from the originating switch 20 to the terminating switch 22 via link 24. The call and specified priority criteria arrive at the terminating switch 22.

Using the recipient's telephone number, the terminating switch queries the ANI trigger table 40 as to whether the call recipient 14 subscribes to any of the special services offered by the telephone service provider. If the call recipient's telephone number does not appear on the ANI trigger table 40, the ANI trigger table 40 signals the terminating switch 22 that the call recipient 14, does not subscribe to any of the special services offered by the telephone service provider. The terminating switch 22 then connects the call to the call recipient 14 via link 28.

If, however, the call recipient's telephone number appears on the ANI trigger table 40, the ANI trigger table 40 signals the terminating switch 22 that the call recipient 14 subscribes to at least one of the special services offered by the telephone service provider. The terminating switch 22 then queries the data base 44 as to the particular special service offered by the telephone service provider to which the call recipient subscribes. The database identifies the call recipient as a subscriber to the telephone call prioritization system and provides the recipient's specified priority criteria and alternative treatment of calls that do not fall within the recipient's specified priority criteria.

Based on the caller's specified priority criteria transmitted with the telephone call and the recipient's specified priority criteria and alternative treatment information, the terminating switch 22 directs the telephone call. If the caller's specified priority criteria satisfies the recipient's specified priority criteria, the call is connected. If the caller's specified priority criteria does not satisfy the recipient's specified priority criteria, the call is rerouted to an alternative destination or terminated.

Figure 2:
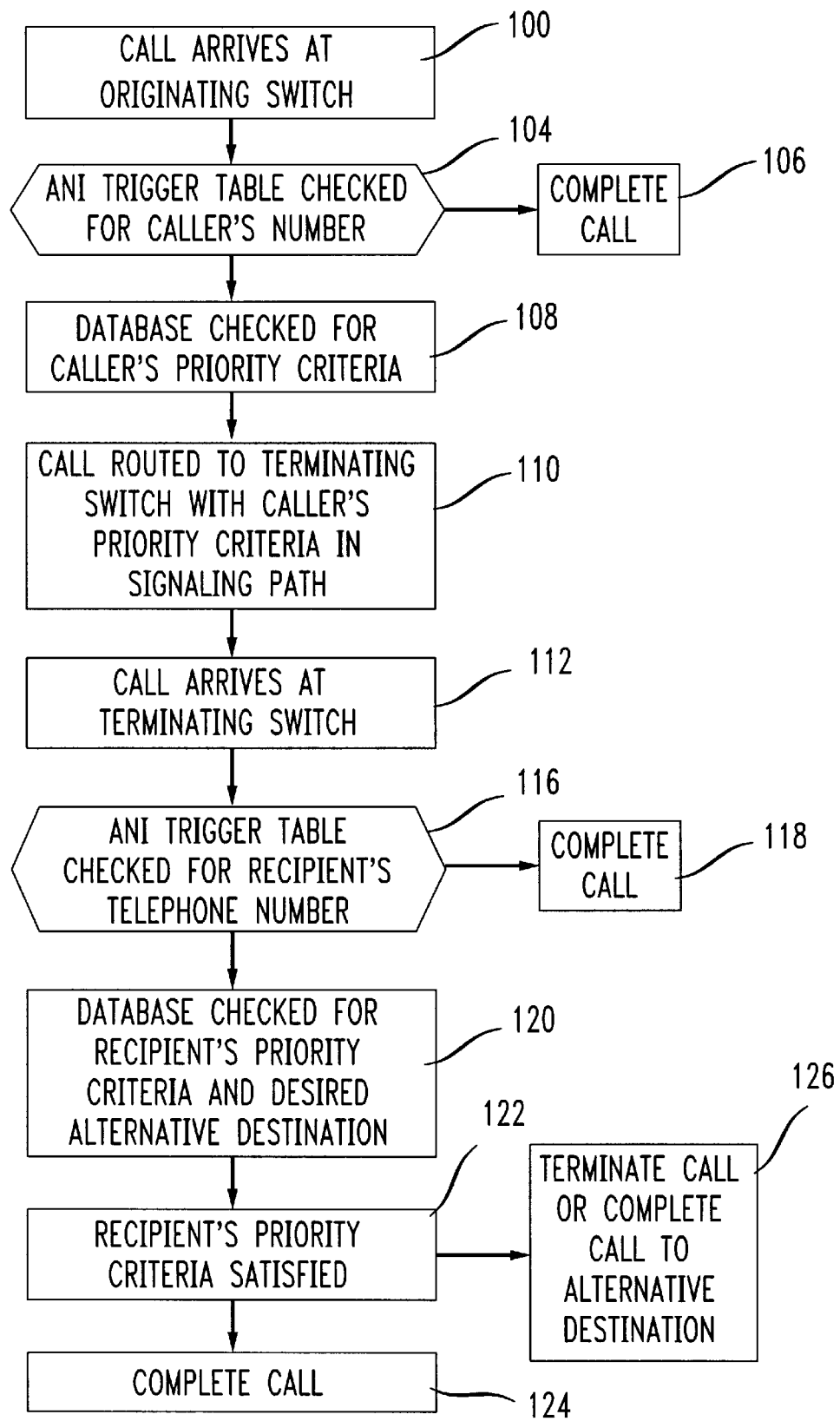
FIG. 2 is a flow diagram illustrating the processing of telephone calls in accordance with the invention.

FIG. 2 is a flow diagram showing the processing of a telephone call in accordance with the principles of the invention. The caller 10 places a telephone call and the telephone call arrives at the originating switch 20 (step 100). Using the caller's telephone number, the originating switch queries the ANI trigger table 32 to check if the caller's telephone number appears (step 104).

If the caller's telephone number does not appear on the ANI trigger table 32, the ANI trigger table 32 signals the originating switch 20 that the caller 10 does not subscribe to any of the special services offered by the telephone service provider and the originating switch 20 then connects the call through the terminating switch 22 via link 24 to the call recipient 14 via link 28 (step 106). If, however, the caller's telephone number appears on the ANI trigger table 32, the ANI trigger table 32 signals the originating switch 20 that the caller 10 subscribes to at least one of the special services offered by the telephone service provider.

The originating switch 22 then queries the data base 36 as to the particular special service offered by the telephone service provider to which the caller subscribes. The database identifies the caller as a subscriber to the telephone call prioritization system and provides the caller's specified priority criteria (step 108). The originating switch 20 then routes the call to the terminating switch 22 with the caller's specified priority criteria in the signalling path (step 110).

The call arrives at the terminating switch 22 (step 112). Using the recipient's telephone number, the terminating switch 22 queries the ANI trigger table 40 to check if the recipient's telephone number appears (step 116).

If the recipient's telephone number does not appear on the ANI trigger table 40, the ANI trigger table 40 signals the terminating switch 22 that the recipient does not subscribe to any of the special services offered by the telephone service provider and the terminating switch 22 connects the call (step 118). If, however, the recipient's telephone number appears on the ANI trigger table 40, the terminating switch 22 queries the data base 44 for the particular special service offered by the telephone service provider to which the call recipient subscribes. The database identifies the call recipient as a subscriber to the telephone call prioritization system and provides the recipient's specified priority criteria and desired alternative treatment of calls that do not fall within the specified priority criteria (step 120).

Finally, based on the caller's specified priority criteria transmitted with the telephone call and the recipient's specified priority criteria and alternative treatment information, the terminating switch 22 directs the telephone call (step 122). If the caller's specified priority criteria satisfies the recipient's specified priority criteria, the call is connected (step 124). If the caller's specified priority criteria does not satisfy the recipient's specified priority criteria, the call is either terminated or rerouted based on the call recipient's alternative treatment information (step 126).

The following is an example of use of the method and apparatus for prioritizing telephone calls.

A telemarketing center subscribes to the telephone call prioritizing system and has specified that all calls originating from its telephone number are "low priority" calls. At 6:30 pm, a telemarketing agent calls a potential customer from that telemarketing center. The potential customer also subscribes to the telephone call prioritizing system and has specified that it does not wish to receive low priority calls between the hours of 5:00 pm and 9:00 am and that incoming low priority calls during those hours should be connected through to his answering machine.

The call arrives at the originating switch that handles the telemarketing center's telephone numbers. The originating switch, using the telephone number of the telemarketing center, queries the ANI trigger table. The ANI trigger table signals the originating switch that the telemarketing center subscribes to at least one of the special services offered by the telephone service provider.

The originating switch then queries the database for the special service offered by the telephone service provider to which the telemarketing center subscribes. The database identifies the telemarketing center as a subscriber to the telephone call prioritization system and provides the telemarketing center's specified priority criteria. The data base signals the originating switch that all calls originating from the telephone number of the telemarketing center are low priority. The originating switch connects the call to the terminating switch with telemarketing center's the low priority specified priority criteria in the signalling path.

The terminating switch queries the ANI trigger table as to whether the call recipient subscribes to any of the special services offered by the telephone service provider. The ANI trigger table signals the terminating switch that the call recipient subscribes to a special service offered by the telephone service provider.

The terminating switch then queries the database as the special service offered by the telephone service provider to which the call recipient subscribes. The database identifies the call recipient as a subscriber to the telephone call prioritizing system and provides the call recipient's specified priority criteria. The database signals the terminating switch that the call recipient does not wish to have low priority calls connected between the hours of 5:00 pm and 9:00 am and that incoming low priority call received during these hours should be connected to an answering machine. Per the call recipient's specified priority criteria and alternative treatment information, the terminating switch connects the call to the recipient's answering machine.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of processing a telephone call, comprising the steps of:

storing a signal representing a call recipient's priority and an association between the recipient's priority and the recipient's individual telephone number;

storing a signal representing a caller's priority, said caller's priority having been selected by a caller; and then assigning said previously stored caller's priority to a telephone call received from said caller; and then directing the telephone call based on a function of said previously stored caller's priority and said recipient's priority.

2. The method of claim 1, wherein the assigning step includes determining whether the caller's telephone number appears on an automatic number identification (ANI) trigger table.

3. The method of claim 1, wherein the assigning step includes using the caller's telephone number to identify and retrieve said previously stored caller's priority from a data base storing previously stored callers' priorities of a plurality of callers.

4. The method of claim 3, wherein the directing step includes using the call recipient's telephone number to identify priority criteria specified by the call recipient and stored in a data base storing previously stored recipients' priority criteria of a plurality of recipients.

5. The method of claim 1, wherein the directing step includes determining whether the call recipient's telephone number appears on an automatic number identification (ANI) trigger table.

6. The method of claim 1, wherein the directing step includes using the call recipient's telephone number to identify priority criteria specified by the call recipient and stored in a data base storing previously stored recipients' priority criteria of a plurality of recipients.

7. The method of claim 1, wherein the directing step includes comparing said previously stored caller's priority to priority criteria specified by the telephone call's recipient.

8. The method of claim 7, wherein the directing step includes connecting the telephone call from said caller to said call recipient if said previously stored caller's priority satisfies said call recipient's specified priority criteria.

9. The method of claim 7, wherein the directing step includes rerouting the telephone call to a destination other than to said call recipient's telephone number if information about the telephone call, including said previously stored caller's priority, satisfies a rerouting condition of said call recipient's specified priority criteria.

10. The method of claim 7, wherein the directing step includes terminating the telephone call if information about the telephone call, including said previously stored caller's priority, satisfies a termination condition of said call recipient's specified priority criteria.

11. The method of claim 7, wherein said previously stored caller's priority is selected as a priority value intermediate between a recipient's criterion that accepts all calls and a recipient's criterion that refuses all calls.

12. The method of claim 1, wherein said previously stored caller's priority is selected from among a palette of priority values chosen by a provider of telephone services.

13. A method of processing telephone calls in a telephone network, comprising the steps of:

for at least two respective recipients, storing a signal representing a call recipient's priority and an association between the recipient's priority and a recipient's individual telephone number;

storing a signal representing a caller's priority, being a priority selected by a caller; and then on receiving a first telephone call from said caller, automatically retrieving said previously stored caller's priority signal and assigning said previously stored caller's priority to said first telephone call, and directing the routing of said first telephone call based on a function of said previously stored caller's priority and the stored priority associated with the number of the recipient of the first telephone call; and then on receiving a second telephone call from said caller, automatically retrieving said previously stored caller's priority signal and assigning said previously stored caller's priority to said second telephone call, and directing the routing of said second telephone call based on a function of said previously stored caller's priority and the stored priority associated with the number of the recipient of the second telephone call.

14. The method of claim 13, wherein the retrieving steps include using the caller's telephone number to identify and retrieve said previously stored caller's priority from a data base, the data base storing previously stored callers' priorities of a plurality of callers.

15. The method of claim 13, wherein the steps of directing said first and second telephone calls include using the telephone numbers of the recipients of the telephone calls to identify priority criteria specified by the call recipients and stored in a data base, the data base storing priority criteria specified by a plurality of call recipients.

16. The method of claim 13, wherein the steps of directing said first and second telephone calls include comparing said previously stored caller's priority to priority criteria specified by recipients of said first and second telephone calls.

17. The method of claim 13, wherein the steps of directing said first and second telephone calls include connecting said first and second telephone calls if said previously stored caller's priority satisfies said first and second call recipients' specified priority criteria.

18. The method of claim 13, wherein said directing step includes rerouting said first and second telephone calls to destinations other than to the dialed telephone numbers if information about said first telephone call, including said previously stored caller's priority satisfies a rerouting condition of said recipients' specified priority criteria.

19. An apparatus for processing a telephone call, comprising:

means for storing priority criteria of a caller;

means for retrieving said priority criteria of said caller in response to receiving a telephone call from said caller, and routing said call along with said caller's priority criteria; and means for receiving said call along with said caller's priority criteria, and routing said call based at least in part on said caller's priority criteria.

20. The apparatus of claim 19, further comprising means for using the caller's telephone number to identify and retrieve said stored caller's priority criteria.

21. The apparatus of claim 19, wherein the means for retrieving uses the caller's telephone number to identify said stored caller's priority criteria in a data base storing priority criteria stored by a plurality of callers.

22. The apparatus of claim 19, wherein routing said call compares said priority criteria of the caller to criteria specified by a call recipient.

23. The apparatus of claim 19, wherein routing said call routes the call if said caller's priority criteria satisfies criteria specified by a call recipient.

24. The apparatus of claim 19, wherein routing said call routes the call to a destination other than a call recipient.

25. A method of processing a telephone call, comprising the steps of:

receiving at an originating switch a telephone call from a caller and processing said call;

routing, to a terminating switch from said originating switch, said call along with priority criteria of said caller determined during said processing; and routing the call from said terminating switch based on a comparison of said caller's priority criteria with a recipient's priority criteria.

26. The method of claim 25, wherein said priority criteria of said caller and said recipient's priority criteria are chosen by the caller and recipient, respectively, from a predefined set of priority values.

27. The method of claim 25, wherein said priority criteria of said caller is selected as a value intermediate between a recipient's priority criterion that accepts all calls and a recipient's priority criterion that refuses all calls.

28. The method of claim 27, wherein routing the call includes terminating the telephone call.

29. The method of claim 25, wherein routing the call includes connecting the telephone call if said priority criteria of said caller satisfies a receipt criterion of said recipient's piority criteria.

30. The method of claim 25, wherein routing the call includes routing the telephone call to a destination other than to the call recipient's telephone number.

* * * * *